Patented Dec. 19, 1933

1,939,973

UNITED STATES PATENT OFFICE 1,939,973

GELATINIZED STARCH PRODUCT

Fred O. Giesecke, Evanston, Ill., assignor to International Patents Development Company, Wilmington, Del., a corporation of Delaware No Drawing. Original application December 26, 1928, Serial No. 328,577. Divided and this application July 20, 1931. Serial No. 552,078, and in Great Britain December 26, 1928

7 Claims. (Cl. 127—32)

This invention relates to a starch product suitable for making adhesive pastes, binders, fillers, and sizes; the product being of particular utility and value perhaps in making sand molds, cores and facings used in metal founding.

The product consists essentially of corn starch gelatinized and in part dextrinized together with a certain amount of corn gluten, and will absorb cold water in relatively large amounts, to form a colloidal paste of strongly adhesive character. The percentage of soluble substances in the product will ordinarily be low, although this factor may be varied as desired. A paste formed from the product will stand for a long time without liquefying to a considerable extent and without fermenting.

The product is made preferably, as a matter of convenience and economy, from what is ordinarily termed "mill starch", that is, the mixture of starch and gluten which, in the extraction of starch from corn by the wet method, is flowed over starch tables to effect the separation of the gluten from the starch.

The mill starch going to the starch tables is in the form of a starch milk having a starch content represented by the density of 4° to 6° Baumé. This magma when diverted for fabrication in accordance with the present invention is partially dewatered, for example by the use of a dewatering filter of the type commonly used in the starch industry for dewatering and washing starch. By this means it is practical to reduce the water content to about 46% (by weight) after which the material is further dewatered by evaporation to have a water content of approximately 38% to 40%. The material in this condition is then subjected simultaneously to heat and pressure between rolls as described in my copending application, Serial No. 328,577, filed December 26, 1928, (of which this application is a division), according to which preferred method the rolls are hollow and kept filled with steam at 90 pounds pressure per square inch to give a temperature inside the rolls of about 331° F. and a superficial temperature of about 300° F. The pressure to which the starch is subjected and the duration of the treatment will be indicated by the fact that in the preferred apparatus the rolls are 30 inches in diameter, are set approximately 0.005 of an inch apart and are revolved about two revolutions per minute. A certain amount of material is allowed to accumulate in the bight of the rolls so as to effect a certain preheating, before the pressure is exerted, and to maintain a constant supply of material. The material from the rolls is in the form of friable, flaky sheets which, for convenience or mixing with water are preferably ground to a fine powder.

When mill starch is used the composition of the mixture sent to the rolls, to give a typical example (subject of course to more or less variation) will be as follows:

Wet basis

| | Percent |
|---|---|
| Solid substances | 60.66 |
| Moisture | 39.34 |
| Total | 100.00 |

Dry basis

| | Percent |
|---|---|
| Starch | 90.81 |
| Protein | 6.64 |
| Soluble substances | 1.12 |
| Ash | 0.29 |
| Oil | 0.78 |

Acidity —0.2% (Titration with phenol phthalein indicator calculated as HCl).
pH=4.2

The product will have substantially the following composition:

| | Percent |
|---|---|
| Solid substances | 92.90 |
| Moisture | 7.10 |
| Total | 100.00 |

Dry basis

| | Percent |
|---|---|
| Starch | 82.20 |
| Protein | 6.21 |
| Soluble substances | 9.68 |
| Dextrine | 8.48 |
| Ash | 0.25 |
| Dextrose | Trace |
| Oil | 0.71 |

Acidity —0.2%
pH=4.8.

Water absorption —6 to 8, that is, one part of the product will absorb cold water in amounts from 6 times to 8 times its own weight.

It will be understood that the items in this table are not mutually exclusive. The dextrine is largely a soluble substance and the protein is also to some extent soluble.

The character of the product may be varied by varying the constituents of the raw material, but more particularly by varying the conditions of treatment. When the material is passed through the heated rolls the starch cells are disrupted and some of the starch is further modified to the dextrine stage. The material under the microscope appears to be largely structureless. The extent of the gelatinization, evidenced by increased capacity of the material to absorb cold water, depends upon the temperature, pressure and duration of the treatment and also upon the water content of the raw material which, in view of practical considerations, should preferably be in the neighborhood of 40%, as described, but may be varied to some extent both ways with corresponding change in the characteristics of the product. The treatment may also produce a trace of dextrose. The capacity of the product for absorbing water will depend in part upon the extent to which the starch is converted into dextrine. The larger the dextrine content the smaller, generally speaking, the capacity for absorption of water. The water absorption capacity of the product may be increased by increasing the water content of the raw material over the amount specified (other factors remaining constant) but at the cost of making the material light and fluffy, which is not desirable.

Products of the character described are particularly valuable as binders, for example as core binders, the gluten apparently serving to increase the bonding or adhesive strength of the material. Cores made with a product having the characteristics indicated by the above analysis will have a green bond strength of from 3½ to 4 pounds and a dry bond strength of 10 pounds, measured by the usual tests. When used as a core binder the product tends to come to the surface, when the core is baked, so as to thereby form a dense, hard, superficial skin.

The gluten content may, of course, be increased or decreased as desired by adding gluten to or removing it from the mill starch before treatment with heat and pressure.

It is also possible to make this product by using a starch and gluten mixture derived from the wet starch method of making corn starch commonly called "table squeegee", to which, however, should be added, in order to make the product comparable with the product above described, a certain amount of gluten; "table squeegee" being deficient in gluten in comparison with mill starch. The table starch, after it has settled on the tables and most of the gluten and water has tailed off, is covered, particularly at the lower ends of the tables, with a film or layer of starch mixed with gluten. The practice is to remove this layer with a rubber squeegee. In order that the material should not be wasted it has been customary to return it to the process for re-separation; but this involves some difficulties and inconveniences, as the material does not separate readily. Consequently, the use of this material for a gelatinized starch product simplifies the process of starch making. Gluten may be added to the "table squeegee" either in amounts to bring up the gluten content to that of mill starch, or in lesser or greater amounts, dependent upon the desired characteristics of the finished product. The "table squeegee" may be treated in the oven or rolls as described above.

It is the intention to cover all modifications of the product of this invention within the scope of the appended claims. For example, the protein ingredients may vary from two or three per cent up to ten percent or more and the dextrine from seven to twelve percent. The water absorption capacity may vary from six to twelve times the weight of the material. The product has a higher water absorption capacity than the adhesive products made from hominy or corn grits, due perhaps to the fact that the material treated is in the form of individual starch cells and finely divided gluten particles instead of aggregates, that is, as grits or kernel fragments. The high water absorption capacity is of special advantage in an adhesive used for making sand cores as less water is required to get the same wetting or spreading effect.

The above described process is not claimed herein as it is claimed in application by the same applicant, Serial No. 328,577, filed December 26, 1928, of which the present application is a division.

I claim:

1. Gelatinized corn starch product containing substances in approximately the following proportions by weight: starch 82%; protein 6%; soluble substances 9% to 10%; dextrine 9%; oil 0.7%; and having a capacity for water absorption of approximately 6 to 8.

2. A corn starch product containing gelatinized starch and substances in approximately the following proportions by weight: protein 2% to 10%; dextrine 7% to 12%; and having a capacity for water absorption of 6 to 12.

3. Corn starch product consisting of a mill starch of starch and gluten the starch ingredient of which is gelatinized.

4. Corn starch product consisting of a mill starch of starch and gluten the starch ingredient of which is in part gelatinized and in part dextrinized.

5. Gelatinized corn starch product consisting of a mill starch of starch and gluten the starch ingredient of which is gelatinized and which contains dextrine to the extent of from 7% to 12%.

6. Gelatinized corn starch product containing about 6% of corn gluten and dextrine to the extent of 7% to 12%, and having a capacity for water absorption of approximately six to eight times its weight.

7. Adhesive substance composed essentially of corn gluten in a finely divided state and individual corn starch cells disrupted and in part dextrinized.

FRED O. GIESECKE.